United States Patent

[11] 3,542,199

| [72] | Inventors | Donald T. Bray<br>732 Elder Place, Escondido, 92025;<br>Ross M. Brown, 372 Via Almar, Palos<br>Verdes Estates, California 90274 |
|---|---|---|
| [21] | Appl. No. | 844,300 |
| [22] | Filed | July 24, 1969 |
| [45] | Patented | Nov. 24, 1970 |

[54] REVERSE OSMOSIS WATER PURIFICATION UNIT
10 Claims, 6 Drawing Figs.

[52] U.S. Cl.................................................. 210/116,
210/130, 210/134, 210/136, 210/137, 210/257,
210/283, 210/315, 210/317, 210/321, 210/434
[51] Int. Cl. .................................................... B01d 31/00
[50] Field of Search.......................................... 210/103,
116, 117, 134, 130, 136, 137, 321, 315, 317, 257,
258, 336, 335, 283, 284, 428, 434

[56] References Cited
UNITED STATES PATENTS
3,456,803  7/1969  RAK ............................ 210/321X Primary Examiner—Frank A. Spear, Jr.
Attorney—Clement H. Allen ABSTRACT: A reverse osmosis water purification unit has a casing containing a semipermeable membrane cartridge with its brine flow control in the form of a pair of connected restricted conduits. Preferably feed water passes through an annular filter surrounding the cartridge before entering one end of the cartridge. Product water is collected in a central tube in the cartridge and is passed through purifying material before being withdrawn from the casing outlet. A product water storage tank may be connected to the product water purifying system so that water drawn from this tank or directly from the product water collector passes through the purifying material before reaching the casing outlet. A connection through a relief valve from the product water collector to the connection between the brine flow control conduits controls pressure in the purified water system.

Patented Nov. 24, 1970

INVENTORS.
DONALD T. BRAY
ROSS M. BROWN
BY
Agent

Patented Nov. 24, 1970  3,542,199

INVENTORS.
DONALD T. BRAY
ROSS M. BROWN
BY
Agent

REVERSE OSMOSIS WATER PURIFICATION UNIT

This invention relates to apparatus for purification of liquids by reverse osmosis.

Purification of liquids, particularly water, by reverse osmosis is now becoming a commercial reality. Small reverse osmosis units are advantageous for purifying water for home use, and produce from a normal municipal supply a grade of water at least equal in quality to so-called bottled water. Reverse osmosis units for this purpose, however, must be efficient and compact and should be self-contained so that no extra or outside equipment such as filters or purifiers are required. Normally it is desirable to filter and often to treat the incoming feed water before it passes through a reverse osmosis membrane cartridge. This removes particulate matter which could clog the flow passages in the membrane cartridge. Suitable chemical treatment will reduce the tendency of the feed water to form scale in the apparatus. Treatment of the product water with activated carbon is desirable to remove traces of objectionable materials and to produce a high grade, polished product water. A simple unit incorporating feed water treatment means, the membrane cartridge and its flow control, as well as product water treatment means arranged for simple yet efficient interconnection of the component parts would represent a distinct step forward in this art.

Summarized briefly, apparatus according to this invention comprises a casing in which is enclosed a semipermeable membrane cartridge having a central collector for product water. This product water collector is connected at one end through a check valve to product water treating and outlet means, and at the other end through another check valve acting as a relief valve, to a connection between a pair of connected restricted conduits which comprise brine flow control means for the membrane cartridge. The product water collector may also be connected to a product water storage tank so that product water being drawn either from the product water collector or the storage tank passes through a bed of activated carbon or other purifying agent before reaching the product water outlet in the casing. Clarification by means of a filter, and a treatment chemical may be applied to the incoming feed water. The check valve and relief valve control the connections of the product water collector to the product water outlet and the brine flow control device respectively, so that product water will just fill up the storage tank and excess over this requirement will flow out through the brine flow control device. Since the product water relief connection is between two restricted conduits, pressure will be maintained in the product water system at a level depending on the resistance in each of the restricted conduits, and the resistance of that conduit between the product water relief valve connection and the brine flow outlet.

Construction and operation of the apparatus of this invention will be more clearly understood from the following more detailed description thereof, and from the annexed drawings in which.

Figure 1:
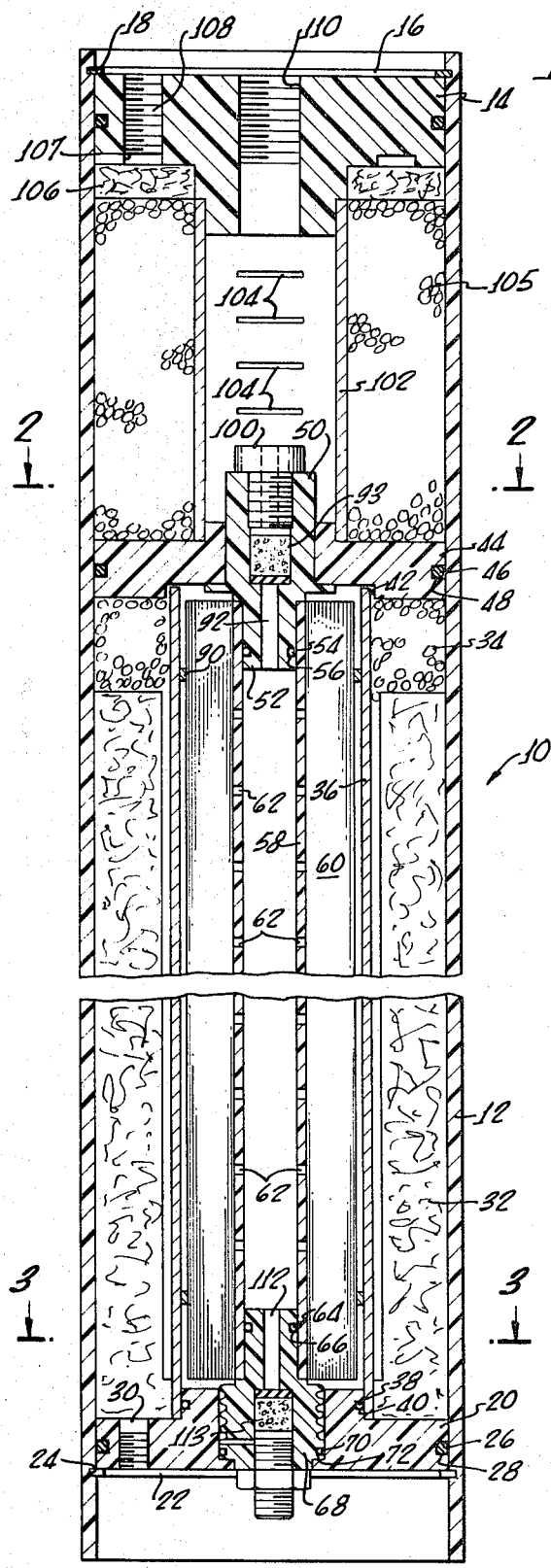
FIG. 1 shows a vertical central section of apparatus embodying features of this invention.
Figure 2:
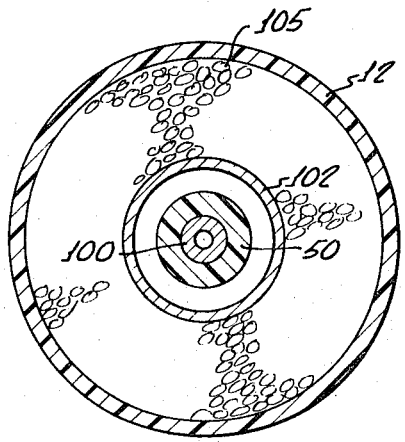
FIG. 2 shows a horizontal cross section of the apparatus of FIG. 1 taken along the line 2–2.
Figure 3:
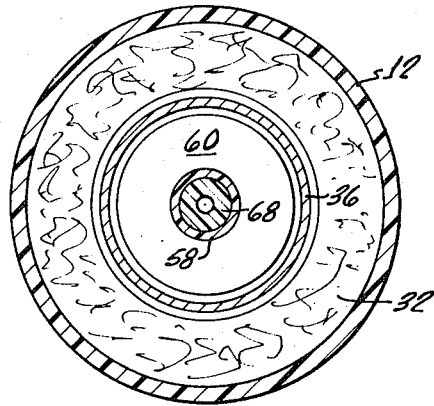
FIG. 3 shows a horizontal cross section of the apparatus of FIG. 1 taken along the line 3–3.

Referring now particularly to FIGS. 1 to 3 the apparatus comprises a unit indicated generally at 10, comprising an outer tubular casing 12 closed at the top (as seen in FIG. 1) by upper end plug 14 held in place by snap ring 16 fitting in groove 18 and at the bottom by lower end plug 20 held in place by snap ring 22 fitting into groove 24. Casing 12 may be fabricated of material suitable for resisting the pressure under which it will operate; ABS or polyvinyl chloride plastics may advantageously be employed where the units internal pressure is not too high. For extremely high pressures, high strength metal may be required. Bottom plug 20 is sealed to the inner wall of casing 12 by 0-ring 26 in its groove 28. At a convenient location, bottom plug 20 is pierced by inlet tube 30 threaded as shown for piping connection. At its upper end tube 30 connects with an annular chamber in which is placed filter element 32. This filter may conveniently be fabricated of porous or fibrous material suitable for filtering particulate matter from the inlet feed water entering the unit through inlet tube 30. Above filter element 32 and still in the annular chamber, may be placed granules 34 of water treatment material, such as a slowly dissolving polyphosphate for scale control. The inner wall of the annular chamber containing filter 32 and chemical granules 34 is formed by shroud 36 which at its bottom end is sealed to bottom plug 20 by 0-ring 38 in groove 40. At its upper end shroud 36 engages a shoulder 42 on septum 44 which itself is sealed to the inner wall of casing 12 by 0-ring 46 in groove 48. Septum 44 divides the casing internally into an upper product water compartment and a lower membrane cartridge compartment. The fit of the upper end of shroud 36 against septum 44 and its shoulder 42 is sloppy or loose to permit liquid passage therebetween for reasons hereinafter explained in more detail. Fitted centrally in septum 44 is middle center plug 50 having a lower tubular extension 52 which is sealed by 0-ring 54 in groove 56 to the top of inner product water collector tube 58 of a reverse osmosis cartridge or unit which will comprise a semipermeable membrane and backing structure and which in the embodiment illustrated is shown as spiral wound reverse osmosis membrane cartridge 60.

Spiral wound reverse osmosis cartridges of the type indicated at 60 are known in the art, they have been described in the literature in U.S. Pat. Nos. 3,367,504 and 3,417,870 and on pages 42 and 43 of the 1964 Saline Water Conversion Report of the United States Department of the Interior, Office of Saline Water, and are further described in our copending U.S. Pat. application Ser. No. 728,410 filed May 13, 1968, now Pat. No. 3,493,496; and are commercially available; so will not herein be described in great detail. Generally they comprise an inner tube as 58 provided with openings, as holes at 62, and around which is wound a pack comprising layers of semipermeable membranes, separator sheets and water flow spacers. Impure feed water introduced under pressure at one end of such a cartridge passes longitudinally through the water flow spacer channels while purified water passing through the membrane layers travels through the separator sheets to holes 62 and then into inner collector tube 58.

Figure 5:
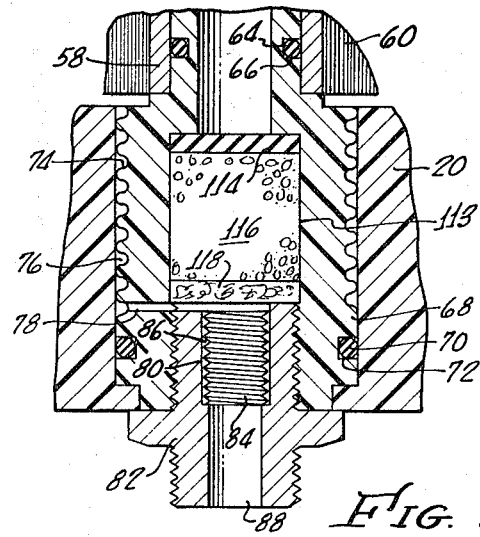
FIG. 5 shows enlarged, and in greater detail, a fragmentary view of the lower check valve and the brine outlet control of the apparatus of FIG. 1.

The bottom of collector tube 58 is sealed by 0-ring 64 in groove 66 to lower center plug 68 which is itself in turn sealed to lower plug 20 by 0-ring 70 in groove 72. Center plug 68 fits into the bottom of tube 58 which forms the product water collector of the cartridge 60 as shown. An upper portion of center plug 68 is provided around its outer edge with a spiral groove 74, seen more clearly in FIG. 5, the lands between convolutions of this spiral groove abut against the adjacent wall of bottom plug 68 forming an elongated, restricted conduit 76. The lower end of conduit 76 is connected by passage 78 to the interior of hole 80 drilled part way from the top in brine outlet fitting 87 which is screwed firmly in the bottom of lower center plug 68. Inside hole 80 and with the outer edges of its threads in close contact with the wall of hole 80 is a section of threaded rod 84. The circumferential spiral groove formed by the threads of rod 84 and the abutting wall of hole 80 form another elongated, restricted conduit 86 communicating with the conduit previously described in the top of center plug 68 through passage 78. The lower or outlet end of the conduit formed by the threads on rod 84 communicates with the outlet opening 88 of fitting 82.

Considering now the flow through the lower part or membrane cartridge compartment of unit 10, impure water to be purified enters at elevated pressure through a suitable fitting screwed into inlet tube 30 and flows upwardly through filter 32 where particulate matter is removed, then passes over the chemical treatment granules 34. Then the clarified and treated feed water flows over the top edge of shroud 36 (through the space or spaces which are present as a result of the loose fit) and downwardly into the top of reverse osmosis membrane cartridge 60. As the water passes downwardly through cartridge 60 pure water is separated therefrom and flows inwardly to be collected in inner tube 58, while the feed water, now more concentrated in salts and termed brine, flows out through the bottom end of cartridge 60. A felt or other soft gasket or ring 90 seals the outside of cartridge 60 to the adjacent wall of shroud 36 to prevent feed water from passing around cartridge 60 instead of longitudinally through it.

Brine flows from the bottom of cartridge 60 through conduit 76, through passage 78, through conduit 86, then through outlet 88 in fitting 82 from where it may be piped to sewer or drain. Conduits 76 and 86 connected by passage 78, form an elongated, restricted conduit which controls the outflow of brine and thus maintains working pressure for proper reverse osmotic action in cartridge 60. Connection of relief valve 113 is made to a point intermediate the ends of this restricted elongated conduit in the embodiment illustrated, by connection of its bottom to passage 78 which connects between conduits 76 and 86 which are in effect segments of the total flow control conduit. Connection at this intermediate point will provide a pressure control through relief valve 113 for the product water portion of the system at a level intermediate the total pressure drop from end to end of the entire elongated restricted conduit. Thus, while the pressure may drop from, for example, 80 p.s.i.g. to atmospheric over the total length of conduits 76 and 86, relief valve 113 will open at a pressure in the product water system of, for example, 40 p.s.i.g., this being determined by the proportionate pressure drop across that part of the total elongated, restricted conduit represented by conduit 86. In the drawings the dimensions of conduits 76 and 86 have necessarily been shown enlarged but ordinarily they will be small so that effective back pressure is maintained and only the desired outflow rate is permitted.

Figure 4:
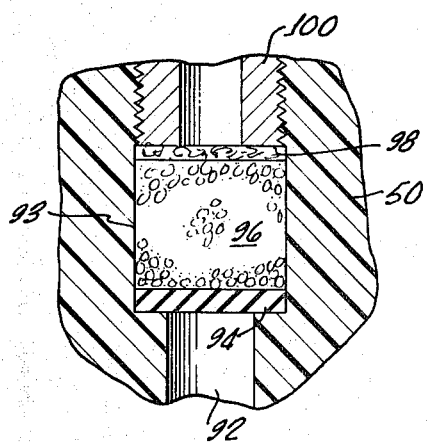
FIG. 4 shows, enlarged, and in greater detail, a fragmentary view of the upper check valve in the apparatus of FIG. 1.

The purified or product water flows upwardly through inner tube 58 then through a channel 92 in middle of center plug 50. It passes then through an upper check valve 93 which is shown in detail in FIG. 4. As will be seen in FIG. 4, the check valve comprises a lower impermeable rubber disk 94, a plug or cylinder 96 made of soft, permeable, and resilient material such as plastic foam or the like, and an upper disk 98 of permeable dacron felt or other porous material. The check valve elements 94, 96 and 98 fit generally loosely in a tubular housing formed as a bore in middle center plug 50 of diameter greater than the diameter of channel 92 which forms an end orifice therefor, and are maintained in place by bored screwed-in fitting 100.

The top interior portion or product water compartment of unit 10 is divided into a central chamber and a second chamber or outer annular space by tube 102 which is provided with restricted apertures such as slits 104. The annular space or chamber between tube 102 and the wall of shell 12 contains water treating or polishing material such as activated carbon granules 105, and at the top is closed by a ring 106 of felt or other filter material. Threaded product water outlet 108 communicates with the upper side of filter ring 106 through collection groove 107. The central chamber inside shroud 102 communicates with central threaded outlet 110.

Product water flowing from inner tube 58 will flow up channel 92, through upper check valve 93 and bored fitting 100 into the central chamber inside tube 102. From this chamber it can flow through the apertures 104 in tube 102 through the bed of activated carbon granules 105 and filter ring 106 to groove 107 and to product outlet 108.

At the bottom of inner tube 58 in cartridge 60, a bore 112 is provided in lower center plug 68 and this communicates with relief valve 113 similar to upper check valve 93 previously described, but inverted. As will be seen more readily in FIG. 5, an enlarged bore in lower central plug 68 forms a tubular housing and contains an impermeable rubber disk 114, a permeable resilient plug or cylinder 116 of plastic foam or the like, and a lower disk 118 of felt or permeable dacron. Rubber disk 114 normally seats against the housing end orifice formed by bore 112. The bottom side of disk 118 communicates with passage 78 which, as has been previously described, connects the restricted conduits 76 and 86. In operation lower valve 113, being at the lower end of the product water tube assembly and with rubber disk 114 normally held against the opening of bore 112 in plug 68, acts as a relief valve as hereinafter described.

Figure 6:
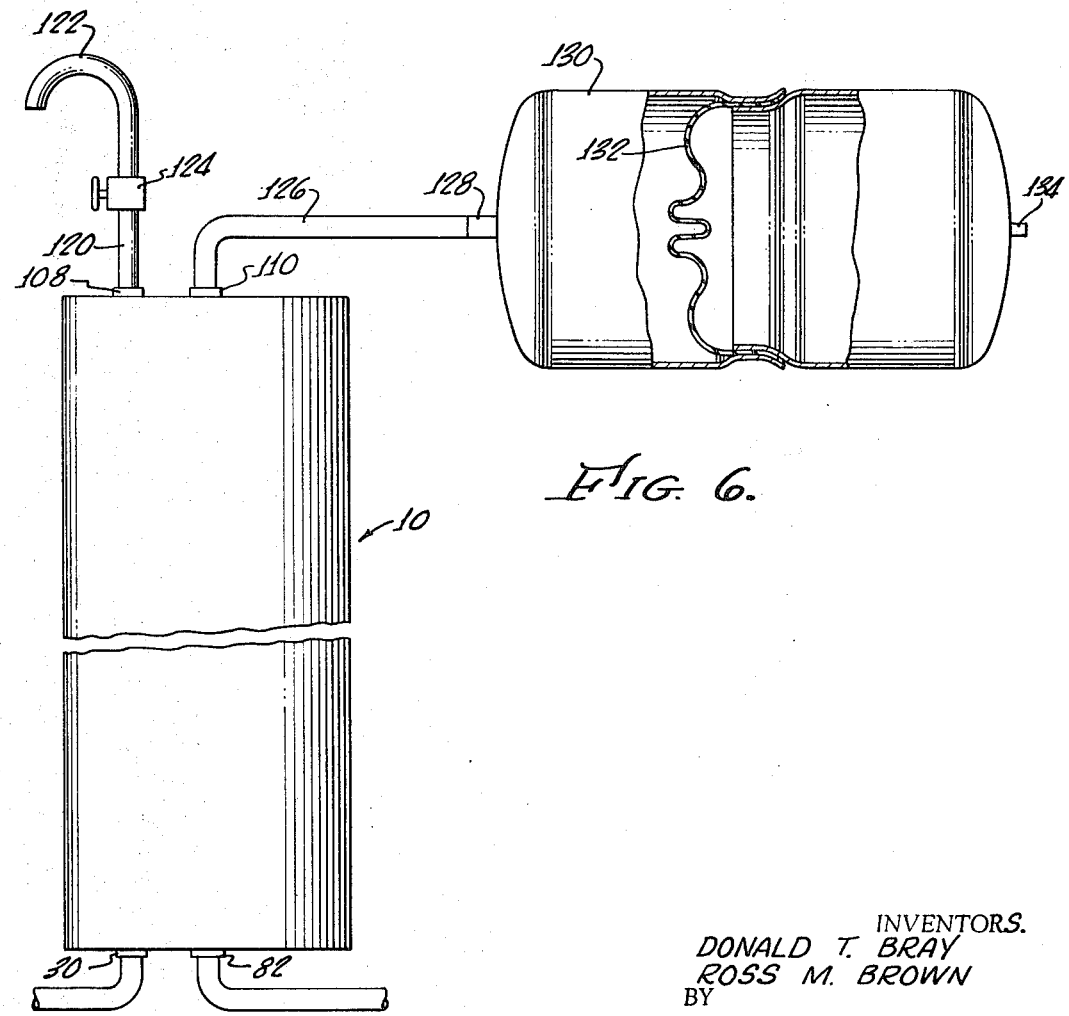
FIG. 6 shows the apparatus of FIG. 1 as in operation, connected to a pressure storage tank and a point of use fount.

A complete water purifying, storing, and dispensing system is shown in FIG. 6. A reverse osmosis unit 10, as previously described, has its inlet 30 connected to a source of water to be purified such as a household supply at a pressure of about 50 to 100 p.s.i.g. Brine outlet 82 is connected to sewer or drain. Product water outlet 108 is connected by pipe 120 to fount 122 controlled by valve 124, to exemplify a point of use. Outlet 110 is connected by pipe 126 to inlet 128 of pressure resistant storage tank 130. A flexible diaphragm 132 separates the interior of tank 130 into a left-hand compartment for water storage and a right-hand compartment which contains air under pressure. A valve, such as bicycle tire valve 134, is employed to introduce an initial small amount of compressed air into the right-hand compartment of tank and to maintain desired compressed air content therein.

In operation, the apparatus of this invention is connected to a suitable supply of water to be purified under pressure as by connection of inlet 30 to a household feed water supply as previously described, and to a product water storage tank 130 and into a system for water use, all as described with reference to FIG. 6. Initially, compressed air at about 2 p.s.i.g. is introduced into the right-hand compartment of tank 130 through bicycle tire valve 134. As product water enters the left-hand compartment of tank 130 it forces diaphragm 132 to the right and compressing the air in the right-hand compartment. This compressed air acting with diaphragm 132 maintains the product water in the tank left-hand compartment always under pressure for distribution to point of use, as for example, fount 122, as shown in FIG. 6. The feed water flows from inlet 30 through filter 32 and chemical granule bed 34, then through membrane cartridge 60, the brine outflow from 82 being controlled by restricted conduits 76 and 86. Purified water flows through the semipermeable membrane in cartridge 60 into collector tube 58 from whence it flows through check valve 93 through tube 102 and outlet 110, through pipe 126 into storage tank 130. While tank 130 is filling the pressure in collector tube 58 is relatively low, and relief valve 113 remains closed due to disk 114 being pressed upward sealing the aperture in the valve top. When tank 130 is filled and product water pressure rises in collector tube 58 it overcomes the pressure exerted on sealing disk 114 and excess product water being produced is relieved to flow out with the brine from membrane cartridge 60. The control pressure exerted on disk 114 in check valve 113 is derived from the position of the connection between the segments of the restricted conduit for brine flow control, that is between conduits 76 and 86. If the total pressure drop across these two conduits is, for example, about 80 p.s.i.g. the relief valve connection may advantageously be arranged to maintain product water pressure at about one-half this or about 40 p.s.i.g. This ratio, however, may be varied considerably depending on the feed water input pressure and the desired product water tank pressure. If, then, the product tank pressure exceeds the 40 p.s.i.g. exerted on the lower side of sealing disk 114 then product water relief to brine flow passage 86 and to outlet 88 will occur. Check valve 93 prevents product water from storage tank 130 flowing back into the lower compartment of casing 12, and relief valve 113 also in one respect acts as a check valve to prevent any brine from passing upwardly into the product water tube 58. Thus the product water pressure is automatically controlled at the desired level and contamination with brine is prevented.

The apparatus of this invention provides a compact organization of feed water treatment means, reverse osmosis membrane cartridge, brine flow control means, and product water control and preferably treatment, all enclosed in a unitary casing. The connections between the product water system and the brine flow control system through the product water system, and the brine flow control system through the product water collector tube is extremely simple and efficient with check and relief valves arranged as described. The arrangement of the connected and restricted conduits to control brine outflow and through an intermediate connection to control product water pressure, is arranged as an integral part of the assembly and is direct and convenient. No outside connections for any of this auxiliary equipment are required, the product water collector tube itself serving, besides its function of collecting product water, as the connection to the purifying system and storage tank connection at the top of the casing, and also to the brine flow control system for its own pressure control at the bottom of the casing.

The product water purifying system as described is efficient to provide water to the casing outlet immediately after having passed through the purifying bed of, for example, activated carbon. Thus the product water supplied to the point of use is demineralized by the membrane cartridge and polished by the activated carbon. The arrangement described ensures that water drawn either from the cartridge product water collector directly, or from the product water storage tank passes over the carbon bed just before withdrawal. This provides a freshly polished purified water output either directly from the membrane cartridge or from the storage tank.

It will be appreciated that various elements described herein are referred to as at the top or bottom, or right or left in the casing or the storage tank. These directions are related to the assemblies as specifically illustrated for clarity and ready understanding. It will be understood that these assemblies may be inverted or reversed as will be apparent, without affect on their operation.

We claim:

1. Reverse osmosis apparatus which comprises a pressure resistant casing enclosing a reverse osmosis membrane cartridge having a product water collector, means for introducing feed water under pressure to said membrane cartridge, outlet means for product water produced by said membrane cartridge, and means for controlling the brine flow from said membrane cartridge; in which the improvements comprise:
    a. a check valve connected between said product water collector and said product water outlet means;
    b. said means for controlling the brine flow from said membrane cartridge comprising an elongated, restricted conduit; and
    c. a relief valve connected between said product water collector and a point intermediate the ends of said elongated, restricted conduit, said relief valve opening at a pressure dependent on the pressure drop across that part of said elongated, restricted conduit between the point of connection of said relief valve thereto and the outlet end thereof.

2. Apparatus according to claim 1 in which said check valve is connected to one end of said product water collector and said relief valve is connected to the other end of said product water collector.

3. Apparatus according to claim 1 in which a shroud surrounds said membrane cartridge and forms, with the inner wall of said casing, an annular chamber in which is contained filter material through which feed water for said membrane cartridge is passed.

4. Apparatus according to claim 1 in which said elongated, restricted conduit comprises a pair of connected, restricted conduits formed by elements having grooved surfaces in contact with surfaces of adjacent elements.

5. Apparatus according to claim 4 in which said grooved elements are cylindrical with grooves in their outer surfaces in contact with the faces of bores in adjacent elements.

6. Apparatus according to claim 1 in which said casing contains also means for purifying product water from said membrane cartridge.

7. Apparatus according to claim 1 in which said casing is divided by a septum into a membrane cartridge compartment and a product water compartment, said product water compartment containing material for purifying product water from said membrane cartridge.

8. Apparatus according to claim 7 in which said product water compartment contains a first chamber connected through said septum and said check valve to said product water collector, and a second chamber communicating with said first chamber through restricted apertures and containing purifying material through which product water is passed.

9. Apparatus according to claim 8 in which a perforated central tube separates said product water compartment into an inner-first chamber connected through said septum and said check valve to said product water collector, said inner chamber also having means for connection to a product water storage tank, and an outer annular second chamber containing purifying materials and through which product water is passed to reach product water outlet means.

10. Apparatus according to claim 1 in which said check valve and said relief valve comprise each, a tubular housing having an end orifice of diameter smaller than the internal diameter of said housing, and an impermeable disk maintained normally in sealing engagement with said end of said housing containing said orifice by a plug of permeable, resilient plastic foam.